Figure 1:
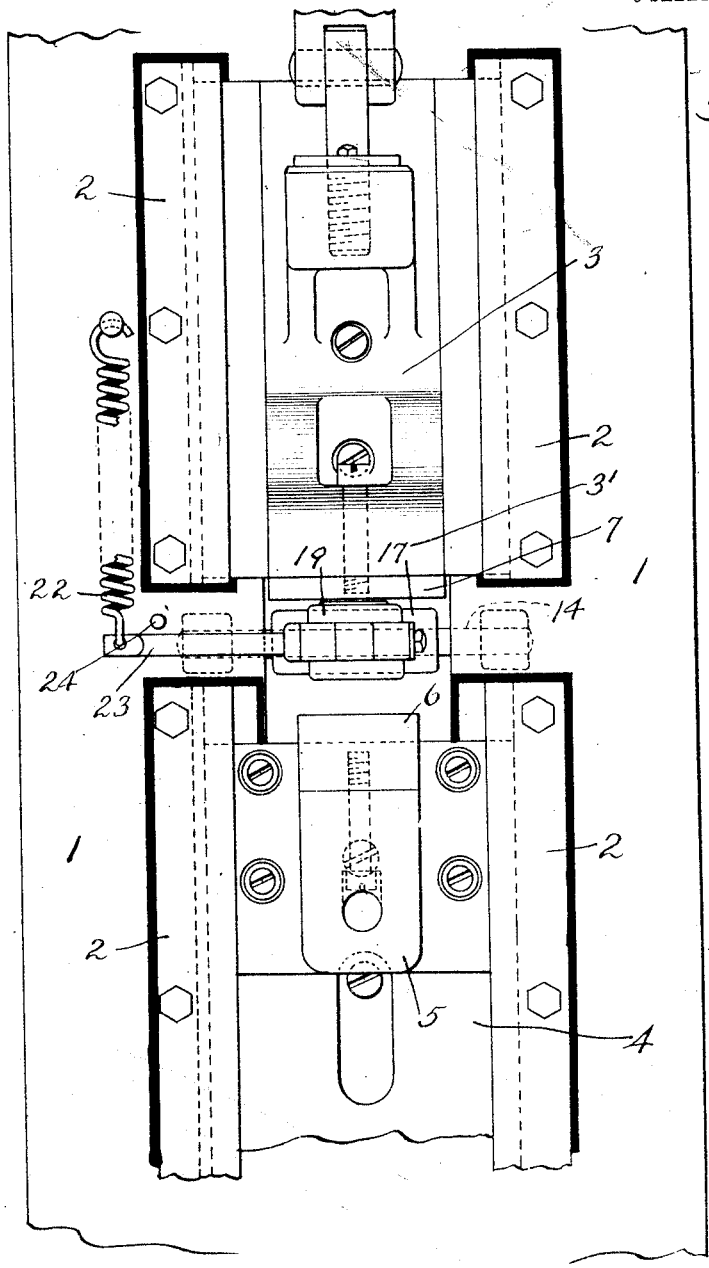

A. F. RIETZEL.
CONTACT FOR ELECTRIC WELDING MACHINES.
APPLICATION FILED AUG. 25, 1908.

1,002,758.

Patented Sept. 5, 1911.

3 SHEETS—SHEET 1.

WITNESSES:
Lillian Blond.
H. C. Townsend Jr.

INVENTOR
Adolph F. Rietzel.
BY
Townsend & Decker
ATTORNEYS

A. F. RIETZEL.
CONTACT FOR ELECTRIC WELDING MACHINES.
APPLICATION FILED AUG. 25, 1908.
1,002,758.
Patented Sept. 5, 1911.
3 SHEETS—SHEET 2.
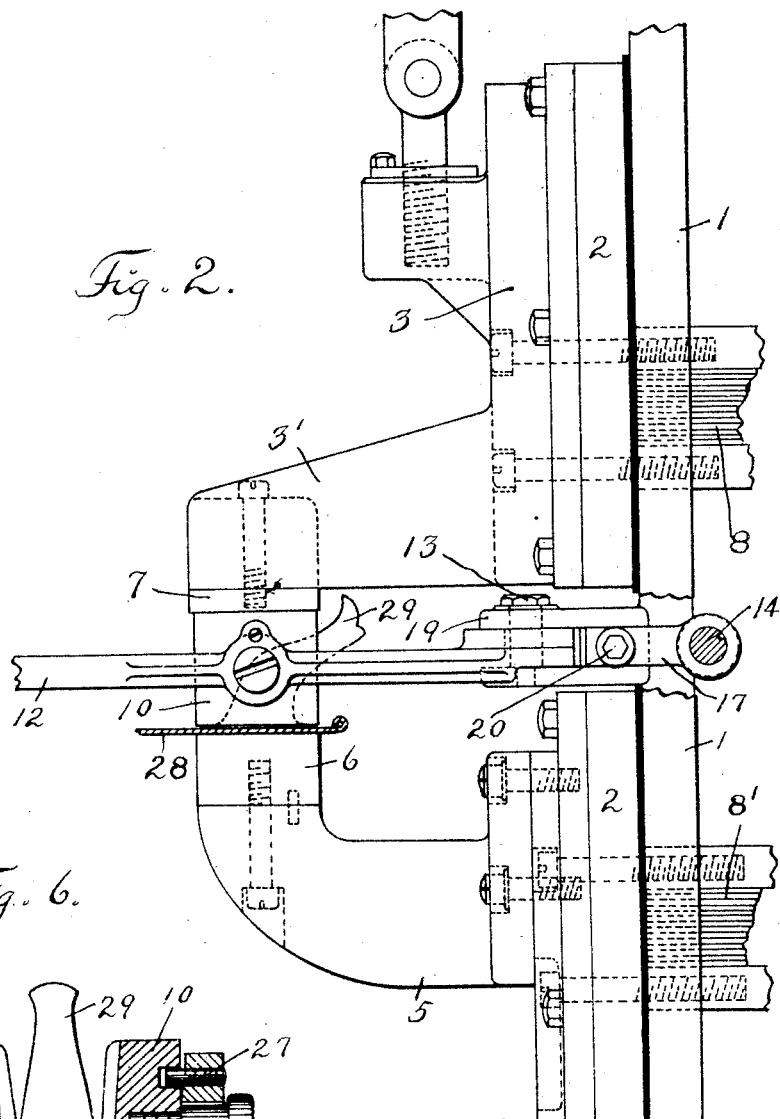
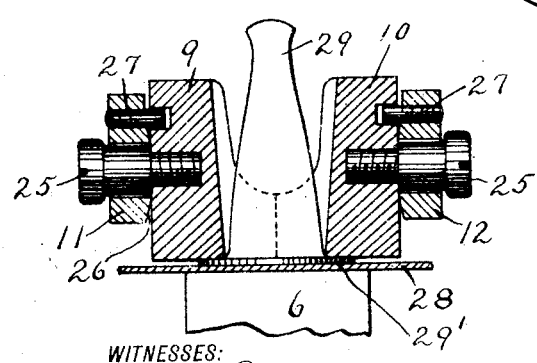
WITNESSES:
INVENTOR
Adolph F. Rietzel.
BY
ATTORNEYS.

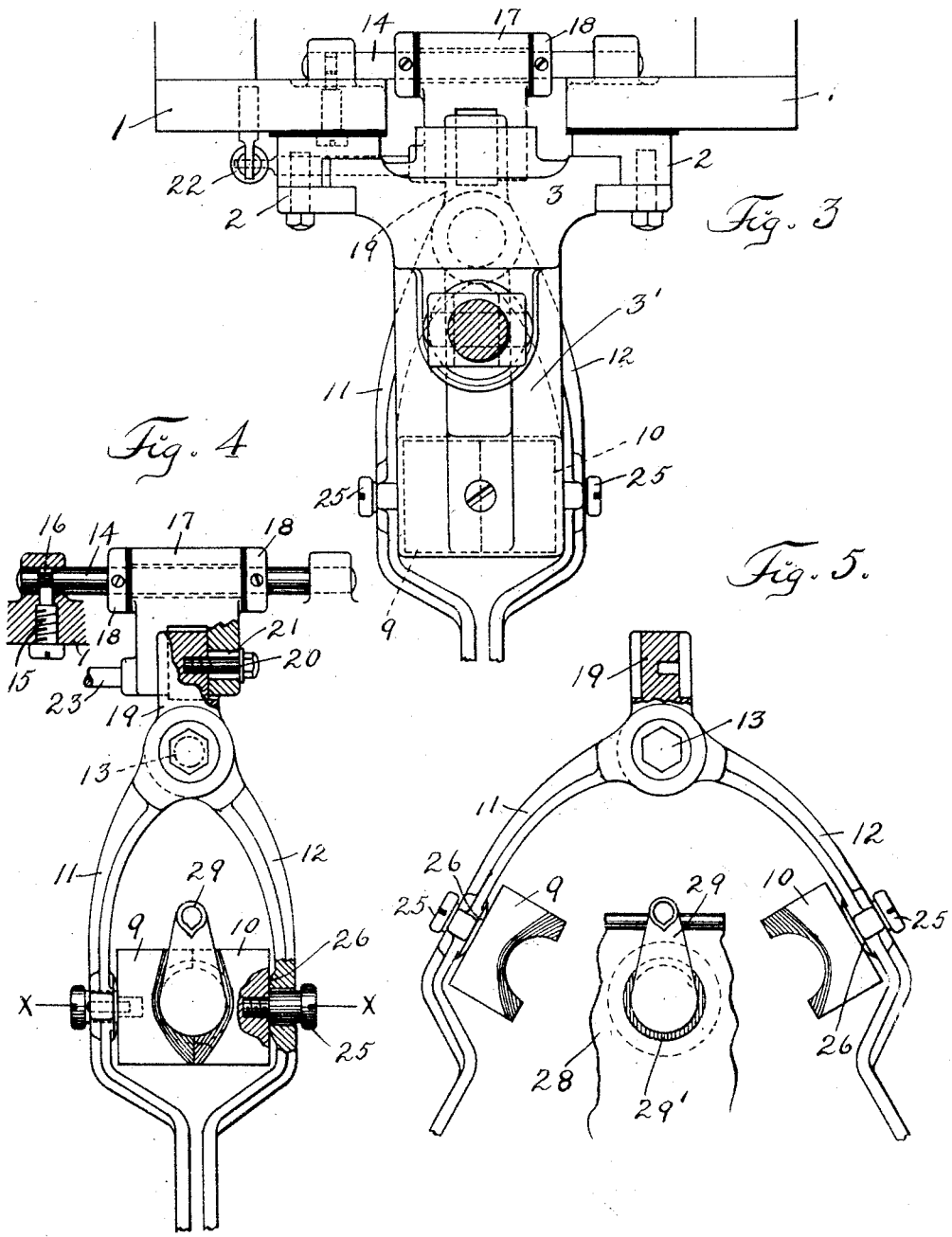

UNITED STATES PATENT OFFICE.

ADOLPH F. RIETZEL, OF CHARLESTOWN, RHODE ISLAND, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

CONTACT FOR ELECTRIC WELDING-MACHINES.

1,002,758.

Specification of Letters Patent. Patented Sept. 5, 1911.

Application filed August 25, 1908. Serial No. 450,140.

*To all whom it may concern:*

Be it known that I, ADOLPH F. RIETZEL, a citizen of the United States, and a resident of Charlestown, in the county of Washington and State of Rhode Island, have invented certain new and useful Improvements in Contacts for Electric Welding-Machines, of which the following is a specification.

My invention relates to apparatus adapted to weld by the use of a heating current of electricity and pressure applied to the heated parts.

A special object of my invention is to construct a machine that may be conveniently used, among other things, for welding attachments to the body of sheet metal utensils such as pots, pans, etc., although by suitable modifications in the shape of the pressure devices, which press the two parts to be welded together, and the contacts, the invention may be employed for welding other objects.

The invention is especially useful for welding spouts or other similar attachments to the bodies of pots, pans or other utensils, where it is desirous to make contact all around the spout or other attachment. It is also useful wherever it is desirable to have a contact for engaging the work movable into and out of engagement with the work independent of the movement of the main electrodes or other part of the machine.

My invention consists broadly in providing an electric welding machine with current-carrying electrodes and contacts for engaging the work at the place or places it is desirable to weld, the said contacts being normally free of the electrodes.

My invention consists further in providing a machine for welding attachments to metal utensils with a contact which will engage the attachment all around the part to be welded.

My invention further consists in providing contacts, for engaging and supplying heating current to the work, which are mounted entirely free from and movable free of the electrodes which supply the current to the contacts.

My invention consists still further in the mounting of the contacts so that a universal movement thereof is obtained.

My invention consists further in the details of construction and combinations of parts hereinafter more particularly described and then specified in the claims.

As above pointed out, my invention is more particularly useful for welding attachments, such as, for instance, spouts, to metal utensils wherein it is necessary to have the contacts grip all around the attachment, which end could not be attained by making the contacts rigid with the main current-carrying electrodes. For this reason my invention will be shown and described as applied to a machine for electrically welding such attachments, a machine of this character being shown and described in my prior application for patent for machine for electrically welding attachments to sheet metal utensils, filed Nov. 8, 1906, S. N. 342,456. Only such parts of the machine as are necessary to illustrate my invention and are different from the machine disclosed in the above-mentioned application will herein be shown, the main operation of the electrical and mechanical parts being the same. However, my invention is not limited to this application of it, as other uses will readily occur to persons skilled in the art and wherein it is desirable to provide a contact for engaging the work which is operated independent of the operation of the main current-carrying electrodes.

In the accompanying drawings, Figure 1 illustrates a front elevation of part of an electric welding machine embodying my invention in its preferred form, parts being removed. Fig. 2 is a side elevation of the same. Fig. 3 is a plan view looking on top of the upper slide or electrode. Fig. 4 is a plan view of the contacts and their operating parts removed from the machine and shown in engaged position with the work. Fig. 5 is a similar view showing the contacts free from the work. Fig. 6 is a vertical section taken on the line X, X, Fig. 4.

1 indicates the front plate of the machine mounted upon suitable framework and provided with guides 2 secured thereto.

3, 4 indicate the upper and lower slides working in the guides 2 and forming the pressure devices for applying pressure to the work and completing the weld. The slide 3 is suspended from a suitable support and is adapted to reciprocate up and down by any suitable means. The lower slide 4 is preferably fixed in one position but may be adjusted to different positions as desired.

A horn 5 mounted upon the lower slide 4 forms an anvil or support upon which the utensil, to which the attachment is to be welded, rests. The end of the horn, preferably, has a detachable block or electrode 6 secured thereto and upon which the utensil rests, so that different shaped blocks might be substituted for the different forms of utensils employed, thus increasing the scope of the machine, and also to effect ready replacement, made necessary by wear or the like.

The upper slide 3 is provided with a projecting arm 3' and has secured to the under side a replaceable block or electrode 7 located vertically over the block or electrode 6.

The upper and lower slides are secured to the terminals 8, 8' of the flexible secondary of a transformer and receive heating current therefrom as is usual in the art, the guides 2 being suitably insulated from the frame.

Ordinarily, if two plain pieces of metal were to be welded together, the parts to be welded would be placed between the blocks or electrodes 6 and 7, the current turned on and the pressure applied by allowing or forcing the slide 3 to drop. However, in welding spouts or similar attachments to utensil bodies, the spout projects a considerable distance from the utensil and is provided with a flange which is welded to the surface of the utensil. In order to effectually weld the parts, the spout must be gripped all around and welded over the entire flange. It is impractical, if not impossible, to so construct the block 7 that it will grip the spout all around its periphery in such a way that a perfect union will be obtained between the parts. I overcome this difficulty by providing an intermediate contact which will engage the spout or other attachment on all sides, which contact is normally free from the electrodes or contact blocks 6 and 7 and capable of movement independent of said blocks to bring it into engagement with the work after which it is engaged by the electrodes to pass heating current to the work. For simplicity, in welding spouts and similar attachments, this intermediate contact is made in two halves suitably cut out to allow for the contour of the spout or other attachment. This pair of contact blocks 9, 10 are each mounted on levers 11, 12 respectively. The levers 11 and 12 are pivotally mounted at one end on a stud 13 and at the other ends a suitable handle is provided for each.

14 indicates a rock shaft journaled in suitable bearings secured to the back of the plate 1. The shaft 14 may be loosely mounted in its bearings but is prevented from slipping longitudinally by a pin 15 working in a groove 16 in the shaft 14 as illustrated more clearly in Fig. 4.

Mounted freely on the shaft 14 is a pivoted arm 17 which projects forward through a suitable opening in the plate 1 and is secured against longitudinal movement on the shaft 14 by collars 18 secured to the shaft, the said arm 17 being preferably insulated from the shaft and frame by means of an insulating bushing and washers. The pivoted arm 17 carries an adjustable contact-lever bearing 19 upon which the contact-levers 11 and 12 are mounted by means of the stud 13. The contact-lever bearing 19 has a sliding connection with the pivoted arm 17 and is secured thereto by a fastening bolt 20. The fastening bolt 20 works in an elongated slot 21 in the arm 17 to permit the bearing 19 to be adjusted back and forth to properly locate the contact-blocks 9 and 10. A tension spring 22, secured at one end to a stud 23 projecting laterally from the free end of the arm 17 and at the other end to the front plate 1, serves to keep the contact blocks 9 and 10 pressed against the block 7 of the upper electrode when brought into position to be engaged thereby, the upward movement of the contact levers, due to the spring 22, when the upper electrode 7 has been raised being limited by a suitable stop-pin 24.

The contact blocks 9, 10 are preferably so mounted on the levers 11, 12 that they will have a universal movement, that is, they will be free to conform themselves to slight irregularities in the shape of the attachment and secure a good grip or continuous contact on the same, they also being mounted in such position that they will be in line with the blocks 6 and 7 secured to the upper and lower slides. This universal or free movement is preferably attained by securing each block to its lever by means of a stud 25 securely fastened to the block and which passes through a hole in the lever of a slightly larger diameter than the stud. The inside of the lever is provided with a rise or boss 26 against which the contact presses when it is caused to grip the work so that the contacts will have a solid bearing against the levers yet be free to vary their position slightly for irregularities in the work. A pin 27 laterally projecting from the contact-lever loosely engages the contact block and prevents the same swinging around due to its loose mounting.

The body of the pot or pan is indicated at 28 while 29 indicates the attachment, here shown in the form of a spout, to be welded thereto. The spout is provided with a flange 29' by means of which it is secured to the part 28 by welding it thereto by any suitable method of electric welding. The contacts 9 and 10 are each cut out so that they will grip the attachment all around its periphery at the flange 29'. Preferably the cutaway portion flares out at the top so that the contacts will not engage the attachment at any other place than down near or at the flange whereby less current is necessary to effect the weld.

In the operation of the apparatus the pot or pan to which the attachment is to be welded is placed on the block 6 and the attachment placed in position thereon. The intermediate contact-blocks 9, 10 are then closed upon the attachment by means of the contact levers. The upper slide is then brought down until the electrode 7 presses upon the top of the intermediate contact-blocks 9, 10 and forces the blocks down upon the flange 29' against the action of the spring 22 after which the current is turned on, it passing from one electrode to the other through the work and the intermediate contacts, thus heating the work to a welding temperature, the weld being completed by the pressure between the two slides as in the prior application above referred to.

The contact-blocks 9 and 10 are readily replaceable by others cut away to different sizes or contours to grip different varieties of attachments.

What I claim as my invention is:

1. In an electric welding apparatus, the combination with the electrodes thereof, of an electrical contact for engaging the work located between the electrodes and normally free therefrom.

2. In an electric welding apparatus, the combination of a pair of electrodes, a contact for engaging the work normally free of the electrodes and means for causing said electrodes to engage said contact.

3. In an electric welding apparatus, the combination of a pair of electrodes, a contact located intermediate of said electrodes and normally free therefrom and means for bringing said electrodes into engagement with said contact.

4. In an electric welding apparatus, the combination of a pair of current carrying electrodes, a contact located between said electrodes and normally free therefrom, means for bringing said contact into engagement with the work by a movement independent of the electrodes, and means for causing said contact to be engaged by said electrodes.

5. In an apparatus for welding attachments to sheet metal utensils, the combination of a pair of pressure current-carrying blocks, one fixed and the other movable toward and away from the first, and an intermediate contact located between said current-carrying blocks and movable into and out of engagement with the work independent of the movement of said current-carrying blocks.

6. In an apparatus for electric welding, the combination of a pair of current-carrying blocks, a contact adapted to engage the work and normally free from said blocks and means for bringing said contact into position where it will be engaged by said blocks.

7. In an apparatus for electric welding, the combination of a pair of current-carrying blocks, an independently mounted intermediate contact normally free from said blocks and means for bringing said contacts into engagement with the work and in position to be engaged by the said blocks.

8. In an apparatus for welding attachments to sheet metal articles the combination of a pair of current-carrying blocks, one fixed and the other movable toward and away from the first and contacts mounted independently of said blocks and adapted to engage the attachment to be welded.

9. In an apparatus for welding attachments to sheet metal articles the combination of a pair of current carrying blocks, one fixed and the other movable toward and away from the first and a pair of intermediate contacts for engaging the work movable transversely to the movement of said blocks.

10. In an apparatus for welding attachments to sheet metal articles the combination of a pair of current-carrying blocks, one fixed and the other movable toward and away from the first and a contact made in halves and adapted to grip all around the attachment to be welded.

11. In an apparatus for welding attachments to sheet metal articles, the combination of a pair of current-carrying blocks, one fixed and the other movable toward and away from the first, pivotally mounted contact-carrying levers mounted independent of said blocks and contacts adapted to engage the work and carried by said levers.

12. In an apparatus for electric welding the combination of current supplying blocks and loosely mounted contacts adapted to engage the work whereby a universal movement of said contacts is attained to enable them to automatically conform to the work.

13. In an apparatus for electric welding the combination of current supply blocks, contact-carrying levers and contacts adapted to engage the work loosely mounted on said levers.

Signed at Stonington in the county of New London and State of Conn. this Aug. 19th, A. D. 1908.

ADOLPH F. RIETZEL.

Witnesses:
JOHN A. LENIHAN,
C. E. MARTIN.